US010714775B2

(12) United States Patent
Ishikawa et al.

(10) Patent No.: US 10,714,775 B2
(45) Date of Patent: Jul. 14, 2020

(54) FUEL CELL SYSTEM

(71) Applicant: TOYOTA JIDOSHA KABUSHIKI KAISHA, Toyota-shi, Aichi-ken (JP)

(72) Inventors: Yuji Ishikawa, Nishio (JP); Takashi Yamamoto, Kariya (JP); Shigeki Hasegawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 157 days.

(21) Appl. No.: 15/879,814

(22) Filed: Jan. 25, 2018

(65) Prior Publication Data

US 2018/0219239 A1 Aug. 2, 2018

(51) Int. Cl.

| | |
|---|---|
| ***H01M 8/04746*** | (2016.01) |
| ***H01M 8/1018*** | (2016.01) |
| ***H01M 8/04701*** | (2016.01) |
| ***H01M 8/04537*** | (2016.01) |
| ***H01M 8/04492*** | (2016.01) |
| ***B60L 58/32*** | (2019.01) |

(52) U.S. Cl.

CPC ......... *H01M 8/04761* (2013.01); *B60L 58/32* (2019.02); *H01M 8/04529* (2013.01); *H01M 8/04634* (2013.01); *H01M 8/04701* (2013.01); *H01M 8/04753* (2013.01); *H01M 8/1018* (2013.01); *H01M 2008/1095* (2013.01); *H01M 2250/20* (2013.01); *Y02T 10/7005* (2013.01); *Y02T 90/32* (2013.01)

(58) Field of Classification Search

CPC ......... H01M 8/04761; H01M 8/04529; H01M 8/04753; H01M 8/04634; H01M 8/04701; H01M 8/1018; H01M 2008/1095; H01M 2250/20; H01M 8/2465; H01M 8/24; B60L 58/32; Y02T 10/7005; Y02T 90/32

See application file for complete search history.

(56) References Cited

U.S. PATENT DOCUMENTS

| | | | | |
|---|---|---|---|---|
| 2007/0231629 A1* | 10/2007 | Clingerman | ...... H01M 8/04089 429/413 |
| 2009/0110985 A1 | 4/2009 | Manabe et al. | |
| 2010/0291446 A1* | 11/2010 | Aso | .................. H01M 8/04253 429/429 |
| 2011/0269046 A1 | 11/2011 | Suematsu | |

FOREIGN PATENT DOCUMENTS

| | | |
|---|---|---|
| JP | 2007012420 A | 1/2007 |
| JP | 2010165463 A | 7/2010 |

* cited by examiner

*Primary Examiner* — Muhammad S Siddiquee
(74) *Attorney, Agent, or Firm* — Dickinson Wright PLLC

(57) ABSTRACT

A fuel cell system includes: a low-frequency superimposition section superimposing a the low-frequency signal on a fuel cell; and an impedance computation section configured to compute low-frequency impedance of the fuel cell at a time when the low-frequency superimposition section superimposes the low-frequency signal on the fuel cell. The fuel cell system includes: a diagnosing section diagnosing a degree of dryness inside the fuel cell on the basis of low-frequency impedance; and an oxidant gas amount adjustment section configured to adjust an amount of oxidant gas in the fuel cell. The diagnosing section is configured to diagnose the degree of dryness inside the fuel cell on the basis of the low-frequency impedance when the oxidant gas amount adjustment section adjusts the amount of the oxidant gas to be equal to or smaller than a reference gas amount.

7 Claims, 9 Drawing Sheets

FUEL CELL SYSTEM

INCORPORATION BY REFERENCE

The disclosure of Japanese Patent Application No. 2017-016938 filed on Feb. 1, 2017 including the specification, drawings and abstract is incorporated herein by reference in its entirety.

BACKGROUND

1. Technical Field

The disclosure relates to a fuel cell system that includes a polymer electrolyte fuel cell.

2. Description of Related Art

As a technique of comprehending a degree of dryness inside a polymer electrolyte fuel cell, a technique of computing moisture content of an electrolyte membrane and moisture content of a catalytic layer on the basis of impedance in a high-frequency range and impedance in a low-frequency range has been known (for example, see Japanese Patent Application Publication No. 2010-165463 (JP 2010-165463 A)). In this JP 2010-165463 A, it is described that the impedance of the fuel cell at approximately 1 kHz as a high frequency is measured as the impedance in the high-frequency range.

SUMMARY

Control equipment with a high operation frequency is required to measure the impedance of the fuel cell at approximately 1 kHz as the high frequency. However, the requirement of such control equipment leads to a significant cost increase of a fuel cell system, and thus is unfavorable.

In view of the above point, the disclosure provides a fuel cell system for which a degree of dryness inside a polymer electrolyte fuel cell can be comprehended without a need of control equipment with a high operation frequency.

The inventors conducted researches on a characteristic of impedance of the fuel cell at a time when a low-frequency signal was superimposed on the fuel cell (hereinafter also referred to as low-frequency impedance).

As a result, it was found out that the low-frequency impedance in a state of an insufficient supply amount of oxidant gas to the fuel cell was changed in a similar manner to the impedance of the fuel cell at a time when a high-frequency signal was superimposed on the fuel cell.

In view of the above-described finding, an aspect of the disclosure is a fuel cell system including a fuel cell that outputs electrical energy through an electrochemical reaction between fuel gas and oxidant gas. The fuel cell is a polymer electrolyte fuel cell. The fuel cell system includes: a low-frequency superimposition section that is configured to superimpose a low-frequency signal on the fuel cell, the low-frequency signal being at a low frequency that is equal to or lower than a specified reference frequency; an impedance computation section that is configured to compute impedance of the fuel cell at a time when the low-frequency superimposition section superimposes the low-frequency signal on the fuel cell; a diagnosing section configured to diagnose a degree of dryness inside the fuel cell on the basis of the impedance that is computed by the impedance computation section; and an oxidant gas amount adjustment section that adjusts an amount of the oxidant gas in the fuel cell. The diagnosing section is configured to diagnose the degree of dryness inside the fuel cell on the basis of the impedance when the oxidant gas amount adjustment section adjusts the amount of the oxidant gas to be equal to or smaller than a specified reference gas amount.

Just as described, when it is configured to compute the impedance of the fuel cell in a state where the oxidant gas is insufficient, control equipment with a high operation frequency is unnecessary, and control equipment with a low operation frequency can be used to comprehend the degree of dryness inside the polymer electrolyte fuel cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will be made on an embodiment of the disclosure on the basis of FIG. 1 to FIG. 10. In this embodiment, a description will be made on an example in which a fuel cell system 1 of the disclosure is applied to a fuel cell vehicle as one type of an electric vehicle.

The fuel cell system 1 includes a fuel cell 10 that outputs electrical energy by using an electrochemical reaction between fuel gas that contains hydrogen and oxidant gas that contains oxygen (for example, air). In this embodiment, a polymer electrolyte fuel cell (a proton-exchange membrane fuel cell: PEFC) is adopted as the fuel cell 10. The fuel cell 10 supplies a DC current generated through power generation to unillustrated electrical loads such as an electric motor and a secondary battery for vehicle travel via a DC/DC converter 51*a*.

The fuel cell 10 has a stacking structure in which plural cells 10*a*, each of which serves as a basic unit, are stacked. Of the plural cells 10*a*, the adjacent cells 10*a* are electrically connected with each other in series.

Figure 1:
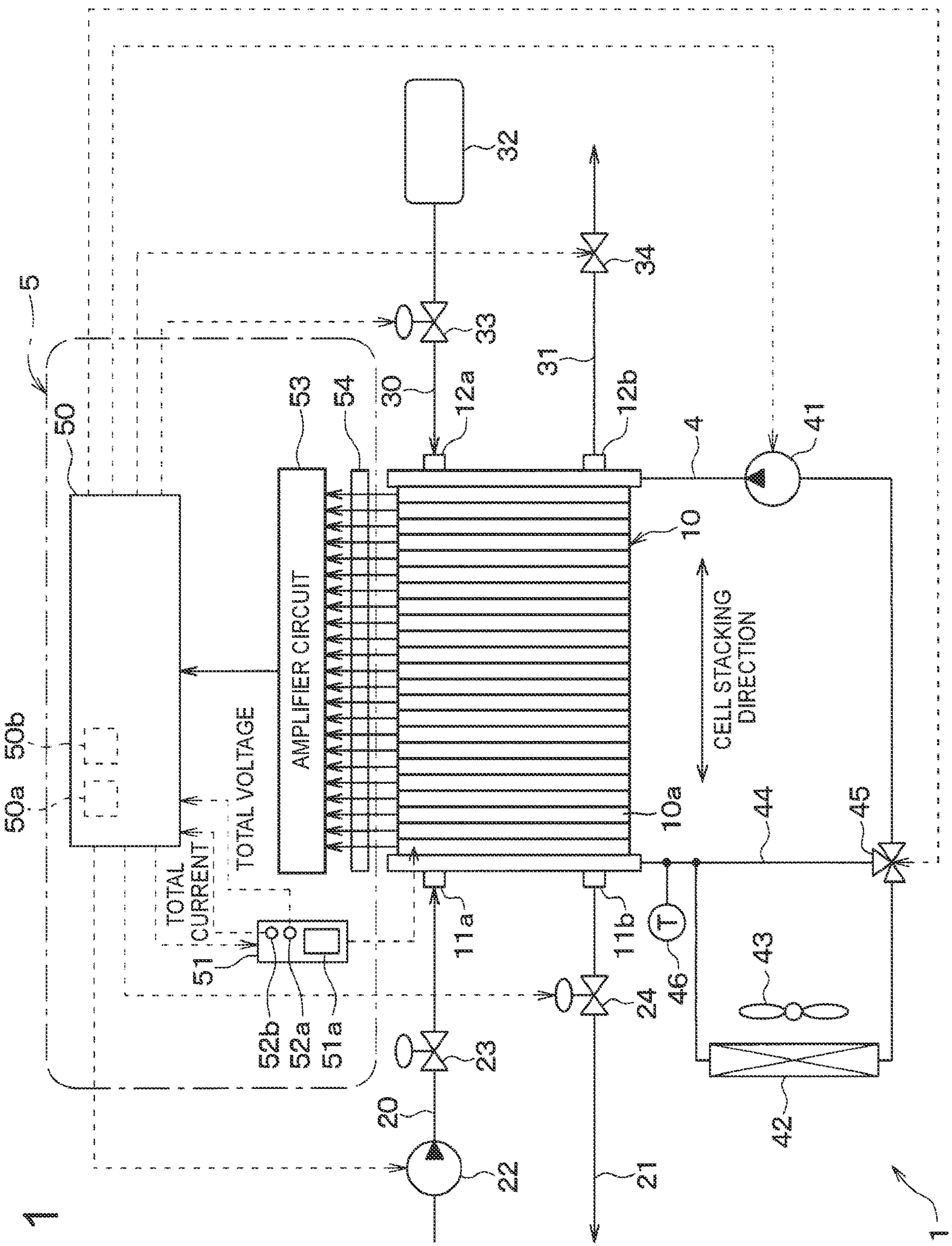
FIG. 1 is a schematic configuration diagram of a fuel cell system according to an embodiment.
Figure 2:
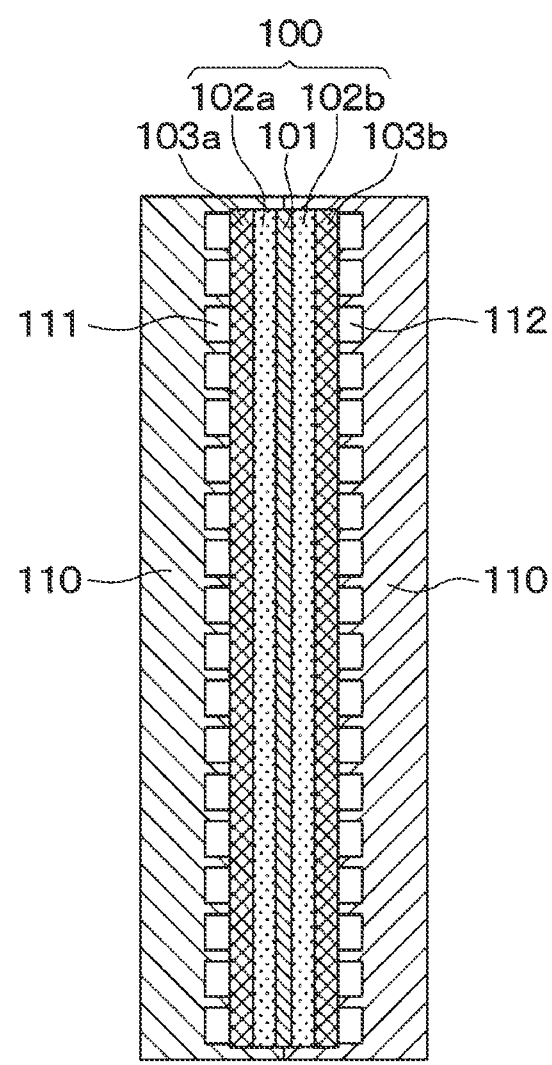
FIG. 2 is a schematic cross-sectional view of a cell in a fuel cell.

As shown in FIG. 2, each of the cells 10*a* includes: a membrane-electrode assembly 100 configured by holding an electrolyte membrane 101 by paired catalytic layers 102*a*, 102*b* from both sides; paired gas diffusion layers 103*a*, 103*b* disposed on both sides of the membrane-electrode assembly 100; and separators 110 that hold these elements therebetween.

The electrolyte membrane 101 is configured as an ion-exchange membrane having proton conductivity, and such an ion-exchange membrane is formed of a polymeric material with a hydrous property such as a fluorocarbon-based material or a hydrocarbon-based material. Each of the paired catalytic layers 102*a*, 102*b* constitutes an electrode. More specifically, the paired catalytic layers 102*a*, 102*b* include: a fuel-side catalytic layer 102*a* that constitutes a fuel electrode; and an air-side catalytic layer 102*b* that constitutes an air electrode.

Figure 3:
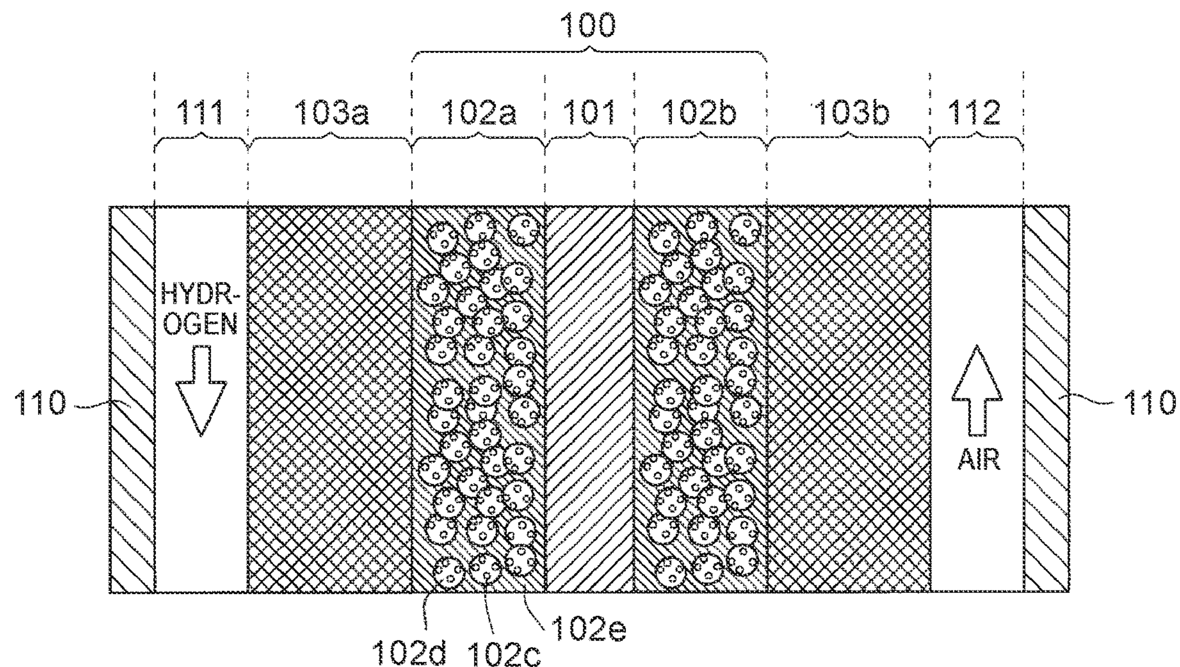
FIG. 3 is a schematic view of an internal structure of the cell in the fuel cell.

As shown in FIG. 3, each of the catalytic layers 102*a*, 102*b* is configured by including: a substance 102*c*, such as a platinum particle, that exerts catalysis; carrying carbon 102*d* that carries the substance 102*c*; and an ionomer (that is, an electrolyte polymer) 102*e* that coats the carrying carbon 102*d*.

The gas diffusion layers 103*a*, 103*b* diffuse the fuel gas and the oxidant gas as reactant gas throughout the catalytic layers 102*a*, 102*b*, respectively. Each of the gas diffusion layers 103*a*, 103*b* is formed of a porous member with gas permeability and electron conductivity such as carbon paper or carbon cloth.

Each of the separators 110 is formed of a carbon substrate with electrical conductivity, for example. In the separators 110, a hydrogen channel 111, through which the fuel gas flows, is formed in a portion opposing the fuel-side catalytic layer 102*a*, and an air channel 112, through which the air as the oxidant gas flows, is formed in a portion opposing the air-side catalytic layer 102*b*.

When supplied with the fuel gas and the oxidant gas, each of the cells 10*a* outputs the electrical energy through the electrochemical reaction between hydrogen and oxygen as expressed by the following equations 1, 2.

(The fuel electrode side) $H_2 \rightarrow 2H^+ + 2e^-$ . . . (the equation 1) (The air electrode side) $2H^+ + 1/2O_2 + 2e^- \rightarrow H_2O$ . . . (the equation 2) Referring back to FIG. 1, the fuel cell 10 is electrically connected to each of the various electrical loads via the DC/DC converter 51*a* that can supply power bidirectionally. Together with a voltage sensor 52*a* and a current sensor 52*b*, the DC/DC converter 51*a* constitutes a current control unit 51 that controls a flow of the power from the fuel cell 10 to each of the various electrical loads or a flow of the power from each of the various electrical loads to the fuel cell 10. Note that the current control unit 51 in this embodiment functions as a constituent element of a diagnostic device 5.

The diagnostic device 5 is connected to the fuel cell 10. This diagnostic device 5 diagnoses a state of the fuel cell 10. The diagnostic device 5 in this embodiment is configured to diagnose a degree of dryness inside the fuel cell 10. The diagnostic device 5 will be described below in detail.

The fuel cell 10 is provided with: an air inlet 11*a* from which the air as the oxidant gas is supplied to the air channel 112 of each of the cells 10*a*; and an air outlet 11*b* through which generated water and impurities are discharged with the air from the air channel 112 of each of the cells 10*a*. An air supply pipe 20 is connected to the air inlet 11*a*. An air discharge pipe 21 is connected to the air outlet 11*b*.

An air pump 22 is provided in an uppermost stream portion of the air supply pipe 20, and pressure-feeds the air that is suctioned from the atmosphere to the fuel cell 10. The air pump 22 is an electric pump that includes: a compression mechanism used to pressure-feed the air; and an electric motor used to drive the compression mechanism.

In the air supply pipe 20, an air pressure regulator 23 is provided between the air pump 22 and the fuel cell 10, and adjusts pressure of the air to be supplied to the fuel cell 10. The air pressure regulator 23 is configured by including: a valve body that adjusts an opening degree of an air channel, through which the air flows, in the air supply pipe 20; and an electric actuator that drives this valve body.

An electromagnetic valve 24 is provided in the air discharge pipe 21, and discharges the generated water, impurities, and the like inside the fuel cell 10 with the air. The electromagnetic valve 24 is configured by including: a valve body that adjusts an opening degree of an air discharge channel, through which the air is discharged, in the air discharge pipe 21; and an electric actuator that drives this valve body. The fuel cell system 1 in this embodiment can adjust back pressure on the air electrode side in the fuel cell 10 by adjusting an opening degree of the electromagnetic valve 24. In this embodiment, the air pump 22, the air pressure regulator 23, and the electromagnetic valve 24 constitute an oxidant gas amount adjustment section that adjusts an amount of the oxidant gas in the fuel cell 10.

The fuel cell 10 is provided with: a hydrogen inlet 12*a* from which the fuel gas is supplied to the hydrogen channel 111 of each of the cells 10*a*; and a hydrogen outlet 12*b* through which unreacted hydrogen and the like are discharged from the hydrogen channel 111 of each of the cells 10*a*. A hydrogen supply pipe 30 is connected to the hydrogen inlet 12*a*. A hydrogen discharge pipe 31 is connected to the hydrogen outlet 12*b*.

A high-pressure hydrogen tank 32 is provided in an uppermost stream portion of the hydrogen supply pipe 30, and is filled with high-pressure hydrogen. In the hydrogen supply pipe 30, a hydrogen regulator 33 is provided between the high-pressure hydrogen tank 32 and the fuel cell 10, and adjusts pressure of hydrogen to be supplied to the fuel cell 10. The hydrogen regulator 33 is configured by including: a valve body that adjusts an opening degree of a hydrogen supply channel in the hydrogen supply pipe 30; and an electric actuator that drives this valve body.

An electromagnetic valve 34 is provided in the hydrogen discharge pipe 31, and discharges a minute amount of unreacted hydrogen and the like to the outside. The electromagnetic valve 34 is configured by including: a valve body that adjusts an opening degree of a hydrogen discharge channel in the hydrogen discharge pipe 31; and an electric actuator that drives this valve body. The fuel cell system 1 in this embodiment can adjust the back pressure on the fuel electrode side in the fuel cell 10 by adjusting an opening degree of the electromagnetic valve 34.

As a cooling system that adjusts a temperature of the fuel cell 10, a coolant circulation circuit 4 is connected to the fuel cell 10 in this embodiment, and a coolant that includes antifreeze or the like circulates through the coolant circulation circuit 4. The coolant circulation circuit 4 is provided with: a coolant pump 41 that causes circulation of the coolant; and a radiator 42 that radiates heat of the coolant that has passed through the fuel cell 10 by heat exchange between the coolant and ambient air. The radiator 42 cools the coolant by using a flow of ambient air that is produced by an electric fan 43.

The coolant circulation circuit 4 is provided with a bypass channel 44 that bypasses the radiator 42 and connects between an inlet of the coolant pump 41 and a coolant outlet of the fuel cell 10. The coolant circulation circuit 4 is further provided with a three-way valve 45 that connects either one of the bypass channel 44 or a coolant outlet of the radiator 42 to the inlet of the coolant pump 41.

In the coolant circulation circuit 4, a temperature sensor 46 is provided near the coolant outlet of the fuel cell 10. This temperature sensor 46 detects a temperature of the coolant that has flowed through the fuel cell 10.

Here, the temperature of the coolant that has flowed through the fuel cell 10 is almost the same as the temperature of the fuel cell 10. Thus, in this embodiment, a detection value of the temperature sensor 46 is regarded as the temperature of the fuel cell 10. In this embodiment, the temperature sensor 46 constitutes a cell temperature detection section that detects the temperature of the fuel cell 10.

The air pressure regulator 23, the hydrogen regulator 33, each of the electromagnetic valves 24, 34, the air pump 22, the coolant pump 41, and the like in this embodiment are connected to an output side of a diagnosis control section 50 of the diagnostic device 5, and are each configured to be controlled by a control signal from the diagnosis control section 50.

Figure 4:
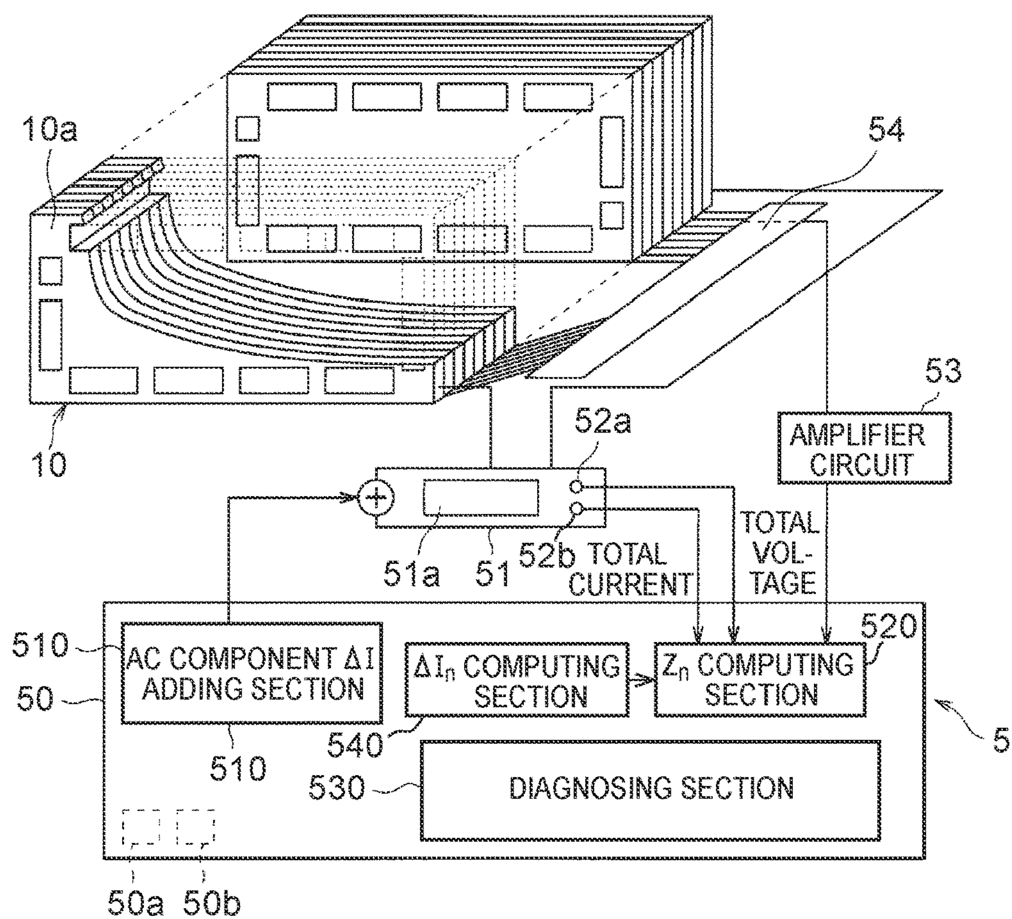
FIG. 4 is a schematic configuration diagram of a diagnostic device in the fuel cell system.

Next, the diagnostic device 5 will be described with reference to FIG. 4. In FIG. 4, in order to illustrate an internal structure of the fuel cell 10, the cells 10*a*, which constitute the fuel cell 10, are partially shown in a perspective view. As shown in FIG. 4, as main constituent elements, the diagnostic device 5 includes the diagnosis control section 50, the current control unit 51 described above, an amplifier circuit 53, and a cell monitor 54.

The diagnosis control section 50 is configured by including a microcomputer and a peripheral circuit thereof, and the microcomputer includes a CPU, ROM, RAM, and the like. The diagnosis control section 50 in this embodiment has an AC component ΔI adding section 510, a $\Delta I_n$ computing section 540, a $Z_n$ computing section 520, and a diagnosing section 530.

The AC component ΔI adding section 510 is a low-frequency superimposition section where a low-frequency signal (an AC component ΔI) at a lower frequency than a predetermined reference frequency (for example, 200 Hz) is superimposed on an output current of the fuel cell 10 via the DC/DC converter 51*a*.

Figure 5:
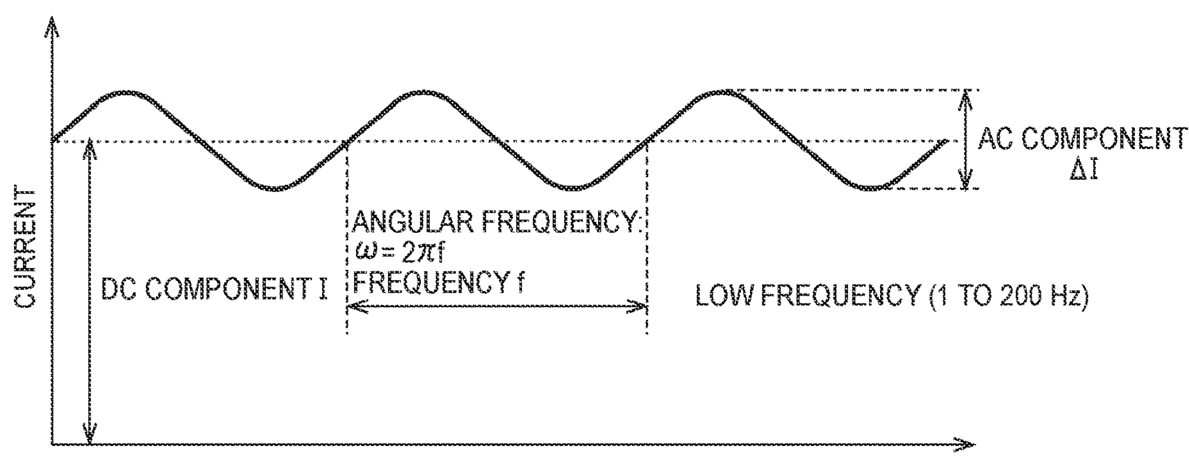
FIG. 5 is a graph illustrating a low-frequency signal that is superimposed on an output current of the fuel cell by an AC component ΔI adding section.

The AC component ΔI adding section 510 superimposes the low-frequency signal that has a waveform shown in FIG. 5 on the output current of the fuel cell 10. The frequency of the signal to be superimposed on the fuel cell 10 is set to fall within a low-frequency range of 1 to 200 Hz. Here, the low-frequency signal to be superimposed by the AC component ΔI adding section 510 is desirably equal to or lower than 10% of the output current (a generated current) of the fuel cell 10 in consideration of its influence on a power generation state of the fuel cell 10.

The $\Delta I_n$ computing section 540 computes a low-frequency AC component $\Delta I_n$ of a total current I that flows through the fuel cell 10 on the basis of a detection current I by the current sensor 52*b*. More specifically, the $\Delta I_n$ computing section 540 computes the AC component $\Delta I_n$ by using a method such as the fast Fourier transform. Note that the current sensor 52*b* constitutes a current detection section that detects the total current I flowing through the fuel cell 10. The total current I is a current that includes the output current of the fuel cell 10 shown in FIG. 5 and the low-frequency signal shown in FIG. 5.

The $Z_n$ computing section 520 constitutes an impedance computation section that computes impedance Zn of the cell on the basis of a detection value of the cell monitor 54 and a detection value of the current sensor 52*b* in a state where the AC component ΔI adding section 510 superimposes the low-frequency signal on the output current of the fuel cell 10.

More specifically, the $Z_n$ computing section 520 computes an AC component ΔV of a cell voltage for each of the cells 10*a* on the basis of an output voltage that is amplified by the amplifier circuit 53. The cell voltage is output from each of the cells 10*a*, and the AC component ΔV is a low-frequency signal. The $Z_n$ computing section 520 in this embodiment computes the AC component ΔV by using a method such as the fast Fourier transform.

The $Z_n$ computing section 520 in this embodiment divides the AC component ΔV by the AC component ΔIn, which is computed by the $\Delta I_n$ computing section 540. In this way, the $Z_n$ computing section 520 can compute the low-frequency impedance Zn (=ΔV/ΔIn) of the cell 10*a* to the low-frequency signal for each of the cells 10*a*. The low-frequency impedance Zn represents an absolute value of the impedance.

The diagnosing section 530 diagnoses the degree of dryness inside the fuel cell 10 on the basis of the low-frequency impedance Zn computed by the $Z_n$ computing section 520. In other words, the diagnosing section 530 diagnoses whether moisture content of the fuel cell 10 is appropriate on the basis of the low-frequency impedance Zn computed by the $Z_n$ computing section 520.

The amplifier circuit 53 is connected to the cell monitor 54, amplifies the voltage that is output from the cell monitor 54, and outputs the amplified voltage to the $Z_n$ computing section 520. The cell monitor 54 is a cell voltage detecting section that detects the cell voltage, which is output from each of the cells 10*a*, for each of the cells 10*a*. Thus, the amplifier circuit 53 amplifies the cell voltage output from each of the cells 10*a*.

In addition to the cell monitor 54, the diagnostic device 5 in this embodiment has the voltage sensor 52*a* in the current control unit 51. This voltage sensor 52*a* constitutes a total voltage detecting section that detects a total voltage output from the entire fuel cell 10, that is, a stacked body of the plural cells 10*a*.

Figure 6:
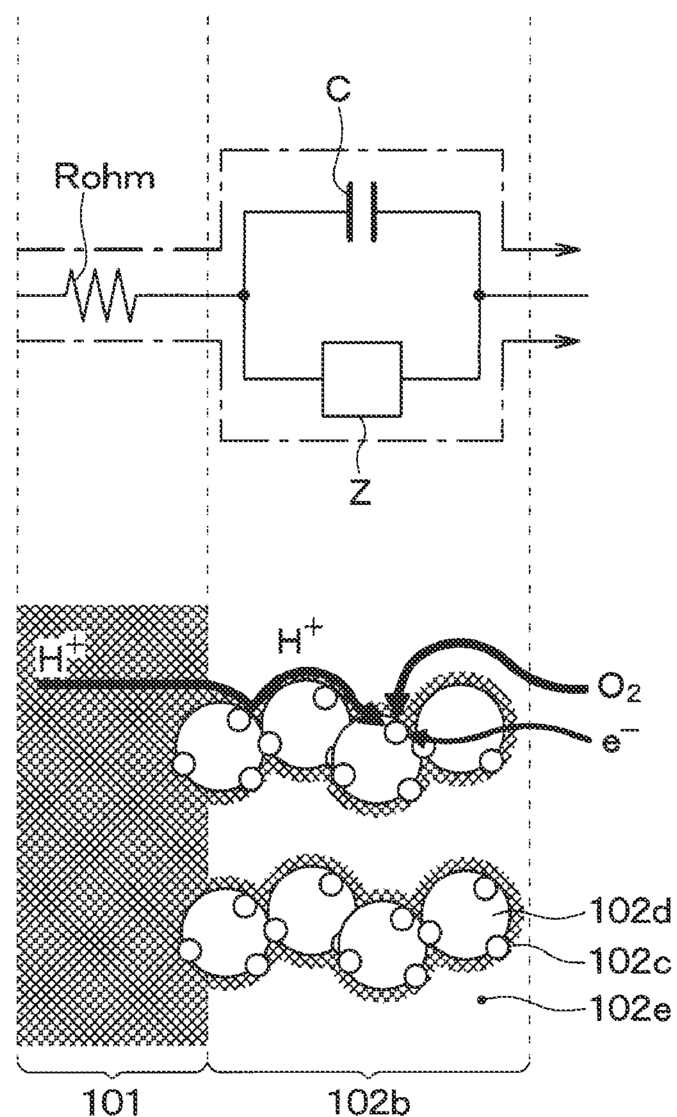
FIG. 6 is a view illustrating a chemical reaction that occurs on an air electrode side at a time when oxidant gas is sufficiently supplied to the fuel cell.
Figure 7:
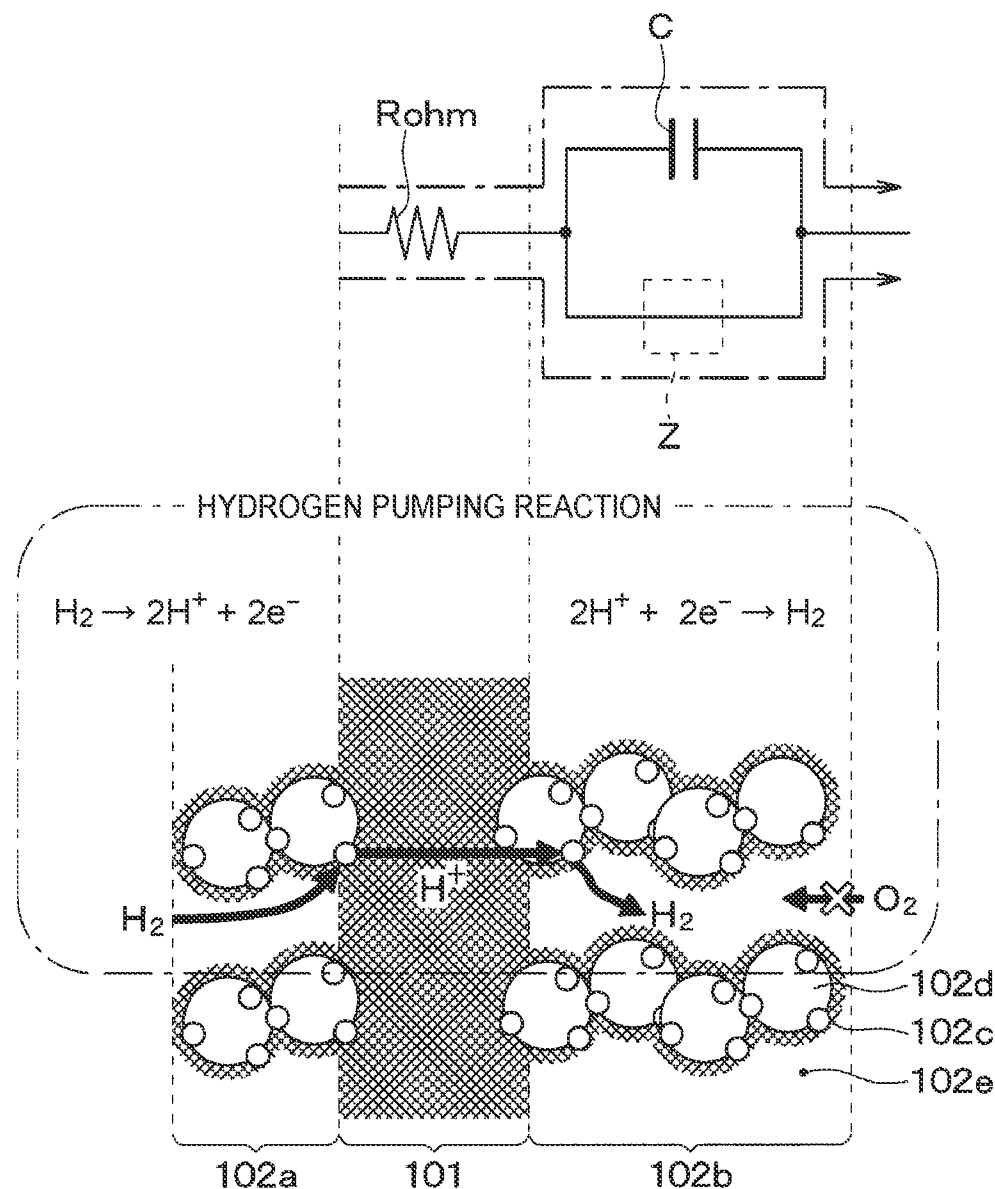
FIG. 7 is a view illustrating a chemical reaction that occurs in the cell at a time when a supply amount of the oxidant gas to the fuel cell is insufficient.

FIG. 6 is a view illustrating a chemical reaction that occurs on the air electrode side of the fuel cell 10 at a time when the air as the oxidant gas is sufficiently supplied to the fuel cell 10. FIG. 7 is a view illustrating a chemical reaction that occurs in the cell 10*a* at a time when a supply amount of the air as the oxidant gas to the fuel cell 10 is insufficient. In each of FIG. 6 and FIG. 7, an internal configuration of the cell 10*a* is shown in a lower portion, and an equivalent circuit to the internal configuration of the cell 10*a* shown in the lower portion is shown in an upper portion.

In the case where the air as the oxidant gas is sufficiently supplied to the fuel cell 10, as shown in FIG. 6, the chemical reaction that is expressed by the above-described equation 2 occurs on the air electrode side. At this time, the air electrode side can be expressed as the equivalent circuit in which parallel connection bodies including an electric double layer C and oxygen diffusion resistance Z (oxygen reduction reaction resistance) are connected in series with respect to a proton transfer resistor Rohm in the electrolyte membrane 101.

In the case where a high-frequency signal at approximately 1 kHz is superimposed on the fuel cell 10 when the air is sufficiently supplied to the fuel cell 10, as indicated by a one-dot chain arrow in the equivalent circuit of FIG. 6, a current path from the proton transfer resistor Rohm to the electric double layer C is formed in the cell 10*a*.

The proton transfer resistor Rohm has such a tendency that a resistance value thereof is increased along with a reduction in the moisture content of the fuel cell 10. Thus, when the air is sufficiently supplied to the fuel cell 10, a change in the proton transfer resistor Rohm, that is, the degree of dryness inside the fuel cell 10 can be comprehended on the basis of the impedance at the time when the high-frequency signal is superimposed on the fuel cell 10.

Meanwhile, in the case where the low-frequency signal is superimposed on the fuel cell 10 when the air is sufficiently supplied to the fuel cell 10, as indicated by a one-dot chain arrow in the equivalent circuit of FIG. 6, a current path from the proton transfer resistor Rohm to the oxygen diffusion resistance Z is formed in the cell 10*a*.

The oxygen diffusion resistance Z tends to be changed by a factor other than the moisture content of the fuel cell 10 (for example, a supply amount of oxygen). Thus, when the air is sufficiently supplied to the fuel cell 10, it is difficult to comprehend the degree of dryness inside the fuel cell 10 on the basis of the impedance at the time when the low-frequency signal is superimposed on the fuel cell 10.

For the above reason, a system of the related art is configured to comprehend the degree of dryness of the fuel cell 10 on the basis of the impedance of the cell 10*a* at the time when the high-frequency signal at approximately 1 kHz is superimposed on the fuel cell 10.

However, control equipment with a high operation frequency is required to measure the impedance of the cell 10*a* at the time when the high-frequency signal at approximately 1 kHz is superimposed on the fuel cell 10. For example, in order to measure the impedance that falls within a high-frequency domain of 200 Hz and higher, such equipment is required that a sampling cycle for A/D conversion is equal to or shorter than 1 msec and that resolution is equal to or higher than 16 bits. However, the requirement of such control equipment leads to a significant cost increase of the fuel cell system, and thus is unfavorable.

Meanwhile, the control equipment with the high operation frequency is unnecessary to measure the impedance of the cell 10*a* at the time when the low-frequency signal of 200 Hz or lower is superimposed on the fuel cell 10. For example, in order to measure the impedance that falls within a low-frequency domain of 20 Hz, such equipment is required that the sampling cycle for the A/D conversion is equal to or longer than 10 msec and that the resolution is equal to or lower than 16 bits.

In order to comprehend the degree of dryness inside the fuel cell 10 by using the control equipment with the low operation frequency, the inventors conducted researches on a characteristic of the impedance of the fuel cell 10 at the time when low-frequency signal was superimposed on the fuel cell 10.

As a result, it was found out that the low-frequency impedance in the state of the insufficient supply amount of the air as the oxidant gas to the fuel cell 10 was changed in a similar manner to the impedance at the time when the high-frequency signal was superimposed on the fuel cell 10 (hereinafter also referred to as the high-frequency impedance).

In the case where the supply amount of the air as the oxidant gas to the fuel cell 10 is insufficient, as shown in FIG. 7, a hydrogen pumping reaction occurs in the cell 10*a*. As expressed by the following equations 3, 4, in the hydrogen pumping reaction, protons ($H^+$) that have been ionized on the fuel electrode side are changed back to hydrogen ($H_2$) after being transferred to the air electrode side.

(The fuel electrode side) $H_2 \rightarrow 2H^+ + 2e^-$ . . . (the equation 3) (The air electrode side) $2H^+ + 2e^- \rightarrow H_2$ . . . (the equation 4) This hydrogen pumping reaction is not accompanied by an oxygen reduction reaction, and the oxygen diffusion resistance Z in the equivalent circuit is lowered to such a level that the oxygen diffusion resistance Z can be ignored. Accordingly, in the state of the insufficient supply amount of the air to the fuel cell 10, the low-frequency impedance hardly includes the oxygen diffusion resistance Z, and is highly correlated with the proton transfer resistor Rohm. That is, in the state of the insufficient supply amount of the air to the fuel cell 10, the low-frequency impedance is changed in a similar manner to the high-frequency impedance.

Figure 8:
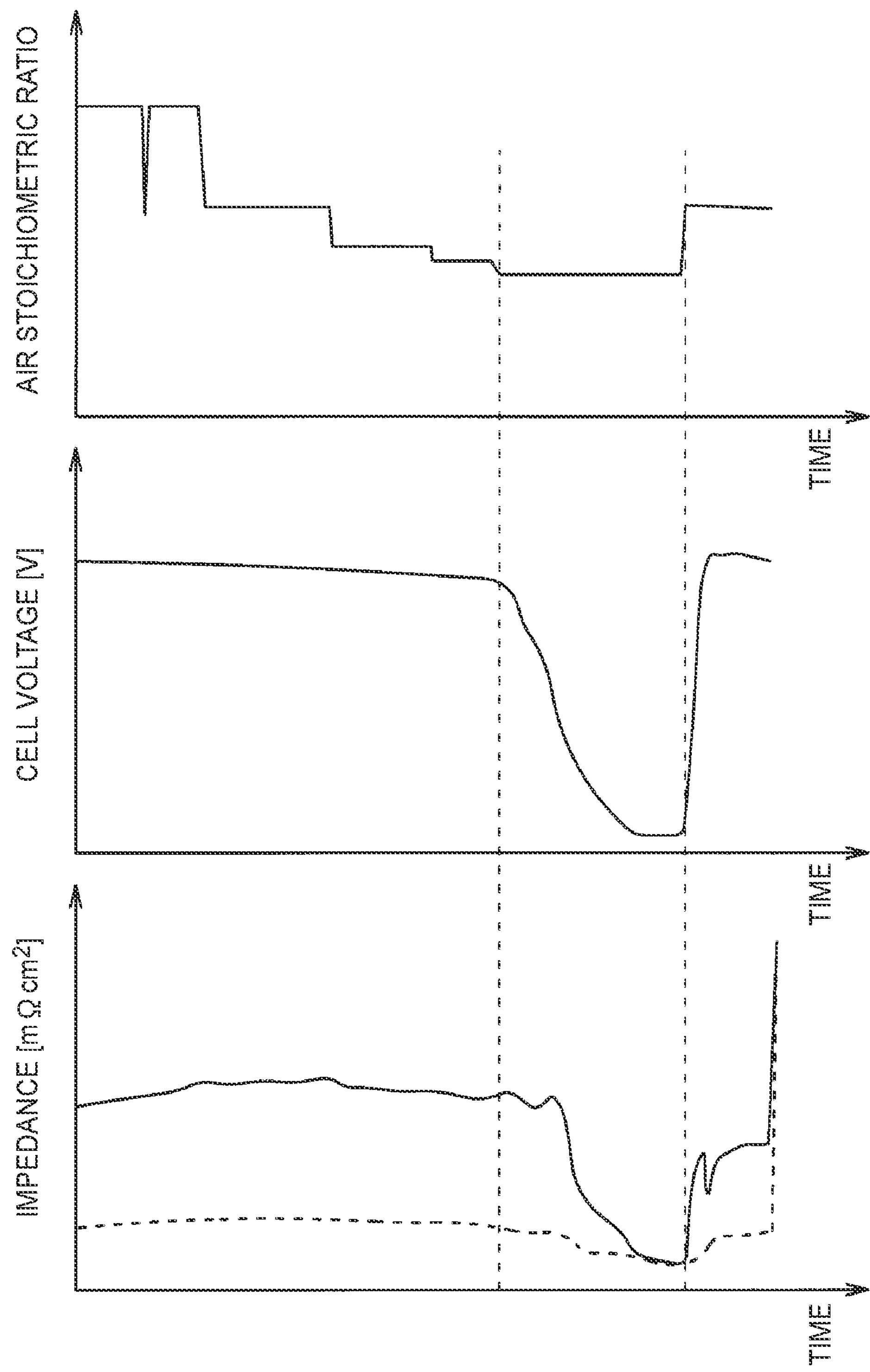
FIG. 8 includes graphs illustrating a change in low-frequency impedance at a time when a supply amount of air to the fuel cell is reduced.

FIG. 8 includes graphs illustrating measurement results of the cell voltage and the low-frequency impedance at a time when the supply amount of the air to the fuel cell 10 is reduced. Note that the graph in an upper portion of FIG. 8 illustrates a temporal change in an air stoichiometric ratio (that is, an air-fuel ratio) as a ratio between the air supply amount and a hydrogen supply amount to the fuel cell 10. In the graph in a lower portion of FIG. 8, the low-frequency impedance is indicated by a solid line, and the high-frequency impedance is indicated by a broken line.

As shown in FIG. 8, in the case where the air stoichiometric ratio is lowered, the cell voltage is lowered to a value near zero after a lapse of a specified duration from a time point at which the air stoichiometric ratio starts being lowered. At this time, the oxygen diffusion resistance Z is lowered. Thus, as shown in the graph in the lower portion of FIG. 8, the low-frequency impedance is lowered to a similar value to the high-frequency impedance.

In accordance with these findings, the diagnosis control section 50 in this embodiment is configured to diagnose the degree of dryness inside each of the cells 10*a*, which constitutes the fuel cell 10, on the basis of the low-frequency impedance Zn when the amount of the air in the fuel cell 10 is adjusted to be equal to or smaller than a specified reference gas amount.

Here, the diagnosis control section 50 in this embodiment is configured as the control equipment with the low operation frequency that can measure the low-frequency impedance Zn of 200 Hz or lower. In this embodiment, in the diagnosis control section 50, a control section that controls the oxidant gas amount adjustment section including the air pump 22 and the like constitutes a gas amount control section 50*a*, and the gas amount control section 50*a* controls the oxidant gas amount adjustment section such that the amount of the air in the fuel cell 10 becomes equal to or smaller than the specified reference gas amount.

In addition, the diagnosis control section 50 in this embodiment is configured to execute moisture content recovery processing to recover the moisture content of the fuel cell 10 in the case where the diagnosing section 530 diagnoses that the moisture content of the fuel cell 10 is insufficient. In this embodiment, in the diagnosis control section 50, a control section that executes the moisture content recovery processing constitutes a recovery processing executing section 50*b*.

Next, a description will be made on diagnostic processing that is executed by the diagnosis control section 50 in the fuel cell system 1 according to this embodiment with reference to a flowchart in FIG. 9. A control routine shown in FIG. 9 is executed periodically or irregularly during an operation of the fuel cell 10, and the like.

Figure 9:
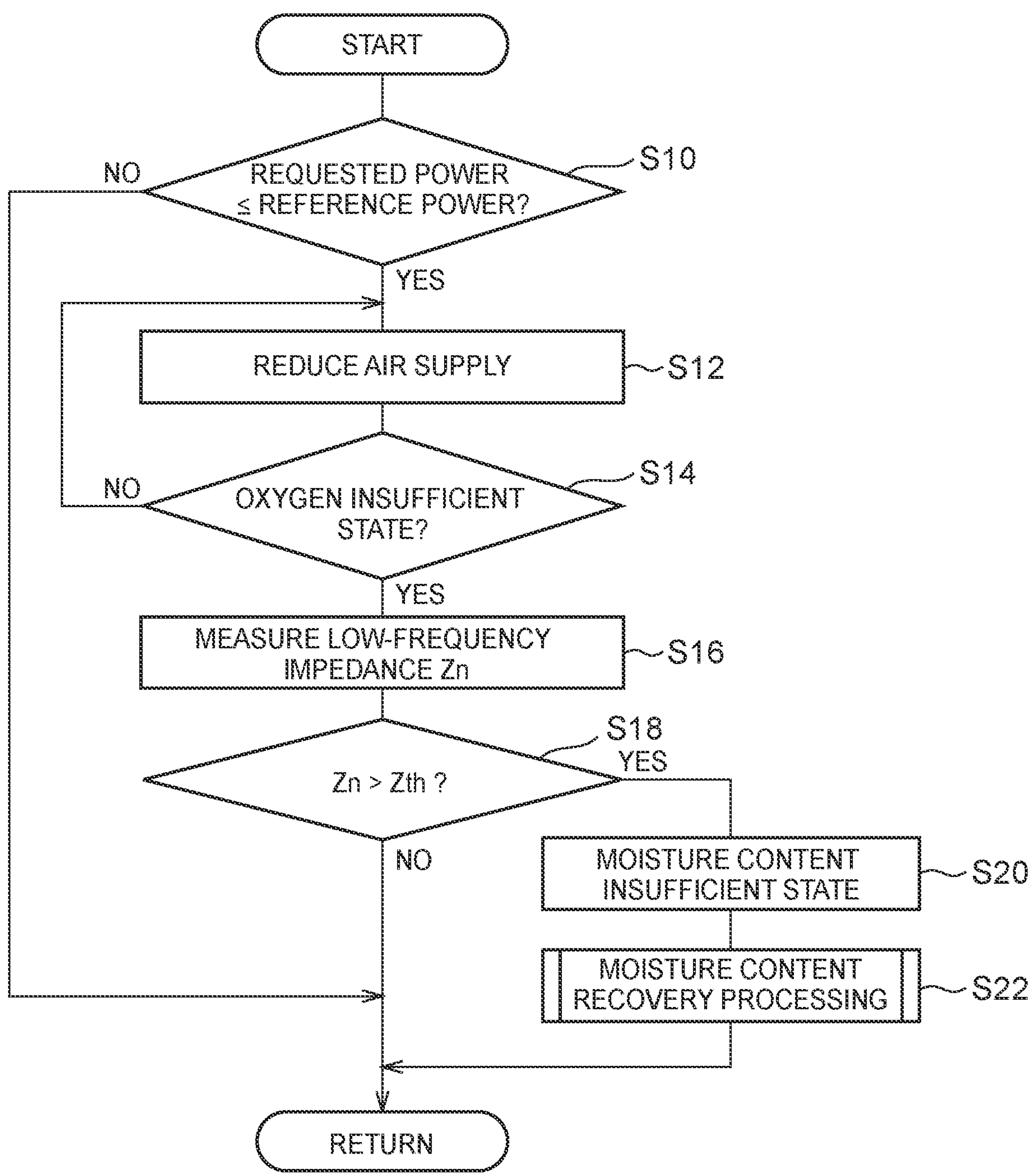
FIG. 9 is a flowchart of diagnostic processing that is executed by a diagnosis control section in the fuel cell system.

As shown in FIG. 9, in step S10, the diagnosis control section 50 first determines whether requested power to the fuel cell 10 by an external system such as a vehicle system is equal to or lower than reference power. The reference power is set to have a lower value than normally requested power that is requested to the fuel cell 10 at a time when the vehicle travels in an urban area. The reference power is, for example, set to requested power at a time when a shift lever of the vehicle is set in a P range, requested power during idling while the vehicle waits at a signal, or requested power at a time when the vehicle travels at a constant speed on a limited highway.

As a result of determination processing in step S10, if it is determined that the requested power to the fuel cell 10 exceeds the reference power, it is concerned that an operation of in-vehicle equipment as a power supply target becomes unstable. Thus, the diagnosis control section 50 terminates the diagnostic processing.

On the other hand, as a result of the determination processing in step S10, if it is determined that the requested power to the fuel cell 10 is equal to or lower than the reference power, in step S12, the diagnosis control section 50 reduces the supply amount of the air to the fuel cell 10 in a state of maintaining a supply amount of hydrogen as the fuel gas. For example, the supply amount of the air can be reduced by reducing a rotational speed of the air pump 22.

Next, in step S14, the diagnosis control section 50 determines whether the fuel cell 10 is in an oxygen insufficient state where the supply amount of the air to the fuel cell 10 is insufficient. The diagnosis control section 50 in this embodiment determines whether the fuel cell 10 is in the oxygen insufficient state on the basis of the cell voltage.

When the fuel cell 10 is brought into the oxygen insufficient state, the power generation by the fuel cell 10 is inhibited, and thus the cell voltage is lowered to the value near zero. In consideration of this fact, the diagnosis control section 50 in this embodiment determines that the fuel cell 10 is in the oxygen insufficient state in the case where the cell voltage is equal to or lower than a reference voltage that is set to the value near zero.

As a result of determination processing in step S14, if it is determined that the fuel cell 10 is not in the oxygen insufficient state, the processing returns to step S12, and the diagnosis control section 50 continues reducing the supply amount of the air to the fuel cell 10.

On the other hand, as a result of the determination processing in step S14, if it is determined that the fuel cell 10 is in the oxygen insufficient state, in step S16, the diagnosis control section 50 measures the low-frequency impedance Zn. More specifically, in the state where the AC component ΔI adding section 510 superimposes the low-frequency signal on the output current of the fuel cell 10, the diagnosis control section 50 computes the low-frequency impedance Zn of the cell 10*a* on the basis of the cell voltage, which is detected by the cell monitor 54, and the detection value of the current sensor 52*b*.

Next, in step S18, the diagnosis control section 50 determines whether the low-frequency impedance Zn is higher than a predetermined dryness determination threshold Zth. For example, the dryness determination threshold Zth is set with an electrical resistance value at a time when the electrolyte membrane 101 is dry being a reference.

As a result of determination processing in step S18, if it is determined that the low-frequency impedance Zn is equal to or lower than the dryness determination threshold Zth, it is considered that the moisture content of the fuel cell 10 is sufficiently secured. Thus, the diagnosis control section 50 terminates the diagnostic processing.

On the other hand, as a result of the determination processing in step S18, if it is determined that the low-frequency impedance Zn is higher than the dryness determination threshold Zth, in step S20, the diagnosis control section 50 diagnoses that the fuel cell 10 is in a moisture content insufficient state where the moisture content of the fuel cell 10 is insufficient. Then, in step S22, the diagnosis control section 50 executes the moisture content recovery processing to recover the moisture content of the fuel cell 10.

The moisture content recovery processing in this embodiment will be described in detail with reference to a flowchart in FIG. 10. The flowchart in FIG. 10 shows a flow of the moisture content recovery processing in step S22 in FIG. 9.

Figure 10:
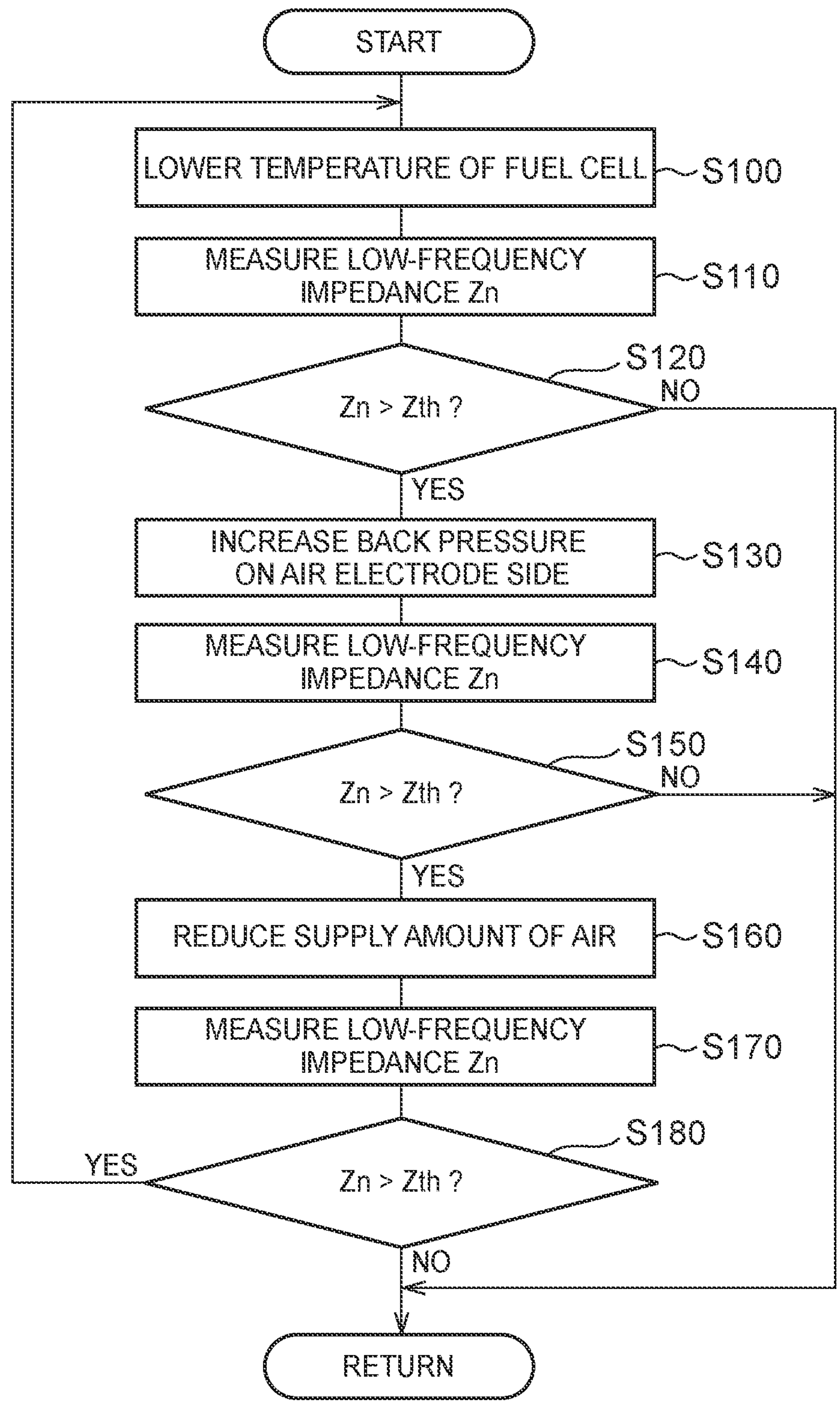
FIG. 10 is a flowchart of moisture content recovery processing that is executed by the diagnosis control section in the fuel cell system.

As shown in FIG. 10, in step S100, the diagnosis control section 50 first lowers the temperature of the fuel cell 10. For example, the diagnosis control section 50 lowers the temperature of the fuel cell 10 by increasing a rotational speed of the coolant pump 41 and increasing a circulation amount of the coolant that circulates through the fuel cell 10. When the temperature of the fuel cell 10 is lowered, saturated vapor pressure of the air that exists inside the fuel cell 10 is lowered, which facilitates condensation of moisture in the air. In this way, the moisture content of the fuel cell 10 is increased. That is, when the temperature of the fuel cell 10 is lowered, the moisture content of the fuel cell 10 is recovered.

Next, in step S110, similar to step S16 shown in FIG. 9, the diagnosis control section 50 measures the low-frequency impedance Zn. Then, in step S120, similar to step S18 shown in FIG. 9, the diagnosis control section 50 determines whether the low-frequency impedance Zn is higher than the dryness determination threshold Zth.

As a result of determination processing in step S120, if it is determined that the low-frequency impedance Zn is equal to or lower than the dryness determination threshold Zth, it is considered that the moisture content of the fuel cell 10 has been recovered. Thus, the diagnosis control section 50 terminates the moisture content recovery processing.

On the other hand, as a result of the determination processing in step S120, if it is determined that the low-frequency impedance Zn is higher than the dryness determination threshold Zth, in step S130, the diagnosis control section 50 increases the back pressure on the air electrode side in the fuel cell 10. For example, the diagnosis control section 50 increases the back pressure on the air electrode side in the fuel cell 10 by reducing the opening degree of the electromagnetic valve 24. When the back pressure on the air electrode side in the fuel cell 10 is increased, the vapor pressure of the air that exists inside the fuel cell 10 is increased, which facilitates the condensation of the moisture in the air. In this way, the moisture content of the fuel cell 10 is increased. That is, when the back pressure on the air electrode side in the fuel cell 10 is increased, the moisture content of the fuel cell 10 is recovered.

Next, in step S140, similar to step S16 shown in FIG. 9, the diagnosis control section 50 measures the low-frequency impedance Zn. Then, in step S150, similar to step S18 shown in FIG. 9, the diagnosis control section 50 determines whether the low-frequency impedance Zn is higher than the dryness determination threshold Zth.

As a result of determination processing in step S150, if it is determined that the low-frequency impedance Zn is equal to or lower than the dryness determination threshold Zth, it is considered that the moisture content of the fuel cell 10 has been recovered. Thus, the diagnosis control section 50 terminates the moisture content recovery processing.

On the other hand, as a result of the determination processing in step S150, if it is determined that the low-frequency impedance Zn is higher than the dryness determination threshold Zth, in step S160, the diagnosis control section 50 reduces the supply amount of the air to the fuel cell 10. For example, the diagnosis control section 50 reduces the supply amount of the air to the fuel cell 10 by reducing the rotational speed of the air pump 22. When the supply amount of the air to the fuel cell 10 is reduced, accumulation of water inside the fuel cell 10 on a downstream side of an airflow is suppressed. As a result, water that has been accumulated in a part of the fuel cell 10 is more likely to be spread all over the fuel cell 10. Thus, the inside of the fuel cell 10 is suppressed from being dried.

Next, in step S170, similar to step S16 shown in FIG. 9, the diagnosis control section 50 measures the low-frequency impedance Zn. Then, in step S180, similar to step S18 shown in FIG. 9, the diagnosis control section 50 determines whether the low-frequency impedance Zn is higher than the dryness determination threshold Zth.

As a result of determination processing in step S180, if it is determined that the low-frequency impedance Zn is equal to or lower than the dryness determination threshold Zth, it is considered that the moisture content of the fuel cell 10 has been recovered. Thus, the diagnosis control section 50 terminates the moisture content recovery processing.

On the other hand, as a result of the determination processing in step S180, if it is determined that the low-frequency impedance Zn is higher than the dryness determination threshold Zth, the processing returns to step S100, and the diagnosis control section 50 continues the moisture content recovery processing. In the case where the moisture content of the fuel cell 10 is not recovered by the continuous execution of the moisture content recovery processing, it is desired to terminate the moisture content recovery processing and stop operating the fuel cell 10.

The fuel cell system 1 in this embodiment that has been described so far is configured to measure the low-frequency impedance of the fuel cell 10 in the state where the air as the oxidant gas is insufficient and to comprehend the degree of dryness inside the polymer electrolyte fuel cell 10 on the basis of the low-frequency impedance.

According to this configuration, the control equipment with the high operation frequency is unnecessary, and the control equipment with the low operation frequency can be used to comprehend the degree of dryness inside the polymer electrolyte fuel cell 10. This configuration makes a significant contribution to cost cut of the fuel cell system 1.

The fuel cell system 1 in this embodiment is configured to measure the low-frequency impedance of the fuel cell 10 while reducing the supply amount of the air in the case where the requested power to the fuel cell 10 is low. According to this configuration, when the processing to comprehend the degree of dryness of the fuel cell 10 is executed, such failure that the power supply target is unstably operated due to output insufficiency of the fuel cell 10 can be suppressed.

The fuel cell system 1 in this embodiment is configured to execute the moisture content recovery processing when the fuel cell 10 is brought into the moisture content insufficient state where the moisture content of the fuel cell 10 is insufficient. According to this configuration, failure such as degradation of the fuel cell 10 that is resulted from the insufficient moisture content of the fuel cell 10 can be avoided.

As the processing to recover the moisture content of the fuel cell 10, the fuel cell system 1 in this embodiment lowers the temperature of the fuel cell 10, increases the back pressure on the air electrode side in the fuel cell 10, and reduces the supply amount of the air to the fuel cell 10.

Differing from an increase in the back pressure on the air electrode side in the fuel cell 10 and a reduction in the supply amount of the air to the fuel cell 10, lowering of the temperature of the fuel cell 10 does not change the supply amounts of the reactant gas such as hydrogen and the air. Thus, the unstable operation of the power supply target is less likely to occur.

In addition, differing from the reduction in the supply amount of the air to the fuel cell 10, the increase in the back pressure on the air electrode side in the fuel cell 10 does not reduce the supply amounts of the reactant gas such as hydrogen and the air. Thus, compared to the reduction in the supply amount of the air to the fuel cell 10, the unstable operation of the power supply target is less likely to occur.

In consideration of these facts, the fuel cell system 1 in this embodiment is configured to sequentially lower the temperature of the fuel cell 10, increase the back pressure on the air electrode side in the fuel cell 10, and reduce the supply amount of the air to the fuel cell 10 in the moisture content recovery processing. According to this configuration, the execution of the moisture content recovery processing can suppress such failure that the power supply target is unstably operated.

(Other Embodiments) The description has been made so far on the representative embodiment of the disclosure. However, the disclosure is not limited to the above-described embodiment, and various modifications can be made thereto as follows, for example.

In the above-described embodiment, the description has been made on the example in which the fuel cell system 1 of the disclosure is applied to the fuel cell vehicle. However, the disclosure is not limited thereto. The fuel cell system 1 of the disclosure can be applied not only to the fuel cell vehicle but also to a stationary power generator used in a household, a factory, or the like, for example.

In the above-described embodiment, the description has been made on the example in which the Zn computing section 520 computes the impedance Zn on the basis of the detection value of the current sensor 52*b*, which detects the total current I flowing through the fuel cell 10, and the detection value of the cell monitor 54. However, the disclosure is not limited thereto.

The fuel cell system 1 may be configured to compute the impedance Zn on the basis of a detection value of a local current sensor capable of detecting a local current inside a surface of the cell 10*a* and the detection value of the cell monitor 54.

Inside the surface of the cell 10*a*, a portion on the upstream side of the airflow in the air channel 112, that is, a portion on the inlet side of the air channel 112 is most likely to be dried. In consideration of this fact, the local current sensor is desirably configured to at least detect the local current that flows through the portion on the upstream side of the airflow in the air channel 112.

In the above-described embodiment, the description has been made on the example in which the supply amount of the air to the fuel cell 10 is reduced in the diagnostic processing when the requested power to the fuel cell 10 becomes equal to or lower than the reference power. However, the disclosure is not limited thereto.

In the diagnostic processing, the supply amount of the air to the fuel cell 10 may be reduced, for example, in the case where the shift lever of the vehicle is set in the P range, in the case where the vehicle is in an idling state while waiting at the signal, in the case where the vehicle travels at the constant speed on the limited highway, or the like.

In the diagnostic processing, the supply amount of the air to the fuel cell 10 is desirably reduced when the requested power that is requested to the fuel cell 10 is lowered. However, the disclosure is not limited thereto. In the diagnostic processing, regardless of a magnitude of the requested power that is requested to the fuel cell 10, the supply amount of the air to the fuel cell 10 may be reduced at specified timing.

In the above-described embodiment, the description has been made on the example in which the low-frequency impedance Zn is measured after the supply amount of the air to the fuel cell 10 is reduced in the diagnostic processing. However, the disclosure is not limited thereto. In the diagnostic processing, the low-frequency impedance Zn may be measured at such timing that the supply amount of the air to the fuel cell 10 is reduced by a request from the external system such as the vehicle system.

In the above-described embodiment, the description has been made on the example in which different types of processing, such as lowering the temperature of the fuel cell 10, increasing the back pressure on the air electrode side in the fuel cell 10, and reducing the supply amount of the air to the fuel cell 10, are executed in the moisture content recovery processing. However, the disclosure is not limited thereto.

The fuel cell system 1 may be configured to execute one or some types of the processing that includes lowering the temperature of the fuel cell 10, increasing the back pressure on the air electrode side in the fuel cell 10, and reducing the supply amount of the air to the fuel cell 10.

In this configuration, there is a case where the moisture permeates from the air electrode side to the fuel electrode side in the fuel cell 10 and the moisture is accumulated on the fuel electrode side. Thus, when the back pressure on the fuel electrode side in the fuel cell 10 is increased, a flow of the moisture that has been accumulated on the fuel electrode side to the electrolyte membrane 101 is promoted. For this reason, the fuel cell system 1 may be configured to execute processing to increase the back pressure on the fuel electrode side in the fuel cell 10 as the moisture content recovery processing.

As in the above-described embodiment, the moisture content recovery processing is desirably executed in the case where it is diagnosed that the fuel cell 10 is in the moisture content insufficient state where the moisture content of the fuel cell 10 is insufficient. However, the disclosure is not limited thereto. For example, the fuel cell system 1 may be configured to execute processing to inform a user or the like of the moisture content insufficient state instead of executing the moisture content recovery processing in the case where it is diagnosed that the fuel cell 10 is in the moisture content insufficient state where the moisture content of the fuel cell 10 is insufficient.

It is needless to say that elements constituting the above-described embodiment are not necessarily essential except for a case where it is clearly mentioned that any of the elements is particularly essential, a case where it is considered that any of the elements is obviously essential in principle, and the like.

In the case where numerical values such as the number, amounts, and ranges of the constituent elements in the above-described embodiment are mentioned, the disclosure is not limited to any of those particular values except for a case where it is clearly mentioned that any of the values is particularly essential, a case where any of the constituent elements is obviously limited to the particular value(s), and the like.

When shapes, positional relationships, and the like of the constituent elements and the like are mentioned in the above-described embodiment, the disclosure is not limited to any of those shapes, those positional relationships, and the like except for a case where the shape, the positional relationship, or the like of any of the constituent elements and the like is clearly mentioned, a case where any of the constituent elements and the like is limited to the particular shape, the particular positional relationship, or the like in principle, and the like.

(Summary) According to a first perspective that is described in a part or a whole of the above-described embodiment, when the amount of the oxidant gas inside the fuel cell is adjusted to the reference gas amount or smaller, the fuel cell system diagnoses the degree of dryness inside the fuel cell on the basis of the low-frequency impedance of the fuel cell.

According to a second perspective, the fuel cell system includes the gas amount control section that controls the oxidant gas amount adjustment section. The gas amount control section is configured to control the oxidant gas amount adjustment section such that the amount of the oxidant gas becomes equal to or smaller than the reference gas amount when the requested power that is requested to the fuel cell is equal to or lower than the specified reference power. Just as described, in the case where the requested power that is requested to the fuel cell is low, the fuel cell is brought into the state where the oxidant gas is insufficient. In this way, such failure that the power supply target is unstably operated due to the output insufficiency of the fuel cell can be suppressed.

According to a third perspective, the fuel cell system includes the recovery processing executing section that executes the moisture content recovery processing to recover the moisture content of the fuel cell. The recovery processing executing section is configured to execute the moisture content recovery processing in the case where the diagnosing section diagnoses that the fuel cell is in the moisture content insufficient state where the moisture content of the fuel cell is insufficient. Just as described, in the case where the fuel cell system is configured to execute the moisture content recovery processing when the fuel cell is brought into the moisture content insufficient state where the moisture content of the fuel cell is insufficient, the failure such as the degradation of the fuel cell that is resulted from the insufficient moisture content of the fuel cell can be avoided.

According to a fourth perspective, the fuel cell system lowers the temperature of the fuel cell in the moisture content recovery processing.

According to a fifth perspective, the fuel cell system increases the back pressure on the oxidant gas electrode side in the fuel cell in the moisture content recovery processing.

According to a sixth perspective, the fuel cell system reduces the supply amount of the oxidant gas to the fuel cell in the moisture content recovery processing.

According to a seventh perspective, the recovery processing executing section of the fuel cell system is configured to sequentially lower the temperature of the fuel cell, increase the back pressure on the oxidant gas electrode side in the fuel cell, and reduce the supply amount of the oxidant gas to the fuel cell.

What is claimed is:

1. A fuel cell system including a fuel cell that outputs electrical energy through an electrochemical reaction between fuel gas and oxidant gas, the fuel cell being a polymer electrolyte fuel cell, the fuel cell system comprising:

a low-frequency superimposition section configured to superimpose a low-frequency signal on the fuel cell, the low-frequency signal being at a low frequency that is equal to or lower than 200 Hz;

an impedance computation section configured to compute impedance of the fuel cell at a time when the low-frequency superimposition section superimposes the low-frequency signal on the fuel cell;

a diagnosing section configured to diagnose a degree of dryness inside the fuel cell on the basis of the impedance computed by the impedance computation section; and an oxidant gas amount adjustment section configured to adjust an amount of the oxidant gas in the fuel cell, wherein the diagnosing section is configured to diagnose the degree of dryness inside the fuel cell on the basis of the impedance only when the oxidant gas amount adjustment section has adjusted the amount of the oxidant gas to be equal to or smaller than a specified reference gas amount.

2. The fuel cell system according to claim 1, further comprising:

a gas amount control section configured to control the oxidant gas amount adjustment section, wherein the gas amount control section is configured to control the oxidant gas amount adjustment section such that the amount of the oxidant gas is adjusted to be equal to or smaller than the reference gas amount when requested power that is requested to the fuel cell becomes equal to or lower than reference power.

3. The fuel cell system according to claim 1, further comprising:

a recovery processing executing section that executes moisture content recovery processing to recover moisture content of the fuel cell, wherein the recovery processing executing section is configured to execute the moisture content recovery processing in a case where the diagnosing section diagnoses that the fuel cell is in a moisture content insufficient state where the moisture content of the fuel cell is insufficient.

4. The fuel cell system according to claim 3, wherein the moisture content recovery processing is lowering a temperature of the fuel cell.

5. The fuel cell system according to claim 3, wherein the moisture content recovery processing is increasing back pressure on an oxidant gas electrode side in the fuel cell.

6. The fuel cell system according to claim 3, wherein the moisture content recovery processing is reducing a supply amount of the oxidant gas to the fuel cell.

7. The fuel cell system according to claim 3, wherein the recovery processing executing section is configured to sequentially lower a temperature of the fuel cell, increase back pressure on an oxidant gas electrode side in the fuel cell, and reduce a supply amount of the oxidant gas to the fuel cell.

* * * * *

UNITED STATES PATENT AND TRADEMARK OFFICE

CERTIFICATE OF CORRECTION

PATENT NO. : 10,714,775 B2
APPLICATION NO. : 15/879814
DATED : July 14, 2020
INVENTOR(S) : Yuji Ishikawa et al.

It is certified that error appears in the above-identified patent and that said Letters Patent is hereby corrected as shown below:

On the Title Page

Please insert the following:
--(30) Foreign Application Priority Data
Feb. 01, 2017 (JP).....................2017-016938--

Signed and Sealed this
Nineteenth Day of January, 2021

Andrei Iancu
*Director of the United States Patent and Trademark Office*